United States Patent
Watts et al.

(10) Patent No.: US 7,298,101 B2
(45) Date of Patent: Nov. 20, 2007

(54) CONTINUOUSLY VARIABLE FREQUENCY SWINGING ARMATURE MOTOR AND DRIVE

(75) Inventors: Dan L. Watts, Aurora, IL (US); Timothy E. O'Connell, Hartland, WI (US); David Vergara, Oconomowoc, WI (US)

(73) Assignee: Panint Electronic Ltd., Hong Kong (CN)

( * ) Notice: Subject to any disclaimer, the term of this patent is extended or adjusted under 35 U.S.C. 154(b) by 0 days.

(21) Appl. No.: 11/276,412

(22) Filed: Feb. 28, 2006

(65) Prior Publication Data
US 2007/0007918 A1    Jan. 11, 2007

Related U.S. Application Data

(60) Provisional application No. 60/657,231, filed on Feb. 28, 2005.

(51) Int. Cl.
    *H02K 33/00* (2006.01)
(52) U.S. Cl. .......................... 318/119; 318/128; 318/122; 318/126; 318/127; 310/13; 310/14; 310/15; 310/50; 173/18
(58) Field of Classification Search ................ 318/119, 318/128, 122, 126, 127; 310/13, 14, 15, 310/50; 173/18
See application file for complete search history.

(56) References Cited

U.S. PATENT DOCUMENTS

| 3,614,543 | A | * | 10/1971 | Dick | 361/154 |
| 3,671,829 | A | * | 6/1972 | Mathews | 318/128 |
| 3,931,554 | A | * | 1/1976 | Spentzas | 318/122 |
| 4,517,620 | A | * | 5/1985 | Boll | 361/154 |
| 4,550,266 | A | | 10/1985 | Kille et al. | |
| 4,705,995 | A | * | 11/1987 | Boll | 318/129 |
| 5,141,162 | A | * | 8/1992 | Gunderson et al. | 239/332 |
| 6,296,065 | B1 | * | 10/2001 | Carrier | 173/217 |
| 6,320,286 | B1 | * | 11/2001 | Ramarathnam | 310/50 |

(Continued)

OTHER PUBLICATIONS 100 and 120 Paint Sprayer Instruction Booklet, Homeright, 2002.

(Continued)

*Primary Examiner*—Rita Leykin
(74) *Attorney, Agent, or Firm*—Whyte Hirschboeck Dudek SC

(57) ABSTRACT

Disclosed herein is a power device. The power device has a power source; timing circuitry powered by the power source for producing a current pulse output having a pulse width; a switch for triggering the current pulse output produced by the timing circuitry; an armature motor powered by the power source and in electrical communication with the timing circuitry for receiving the current pulse therefrom, the armature motor comprising: an electro-magnetic core; a first winding for carrying electric current to energize a magnetic field associated with the electro-magnetic core; a second winding for carrying current to reset the magnetic field associated with the electro-magnetic core, the first and second windings wound about the electro-magnetic core; and a swinging armature for providing movement in response to the energizing of the magnetic field about electromagnetic core. The first winding and the second winding are bifilar wound together about the electro-magnetic core. When the switch triggers the current pulse from the timing circuitry, the armature operates at the current pulse output pulse width. The invention permits higher frequency operation and more output pressure/output to be generated with devices with variable speed motors.

21 Claims, 2 Drawing Sheets

U.S. PATENT DOCUMENTS

Figure 1:
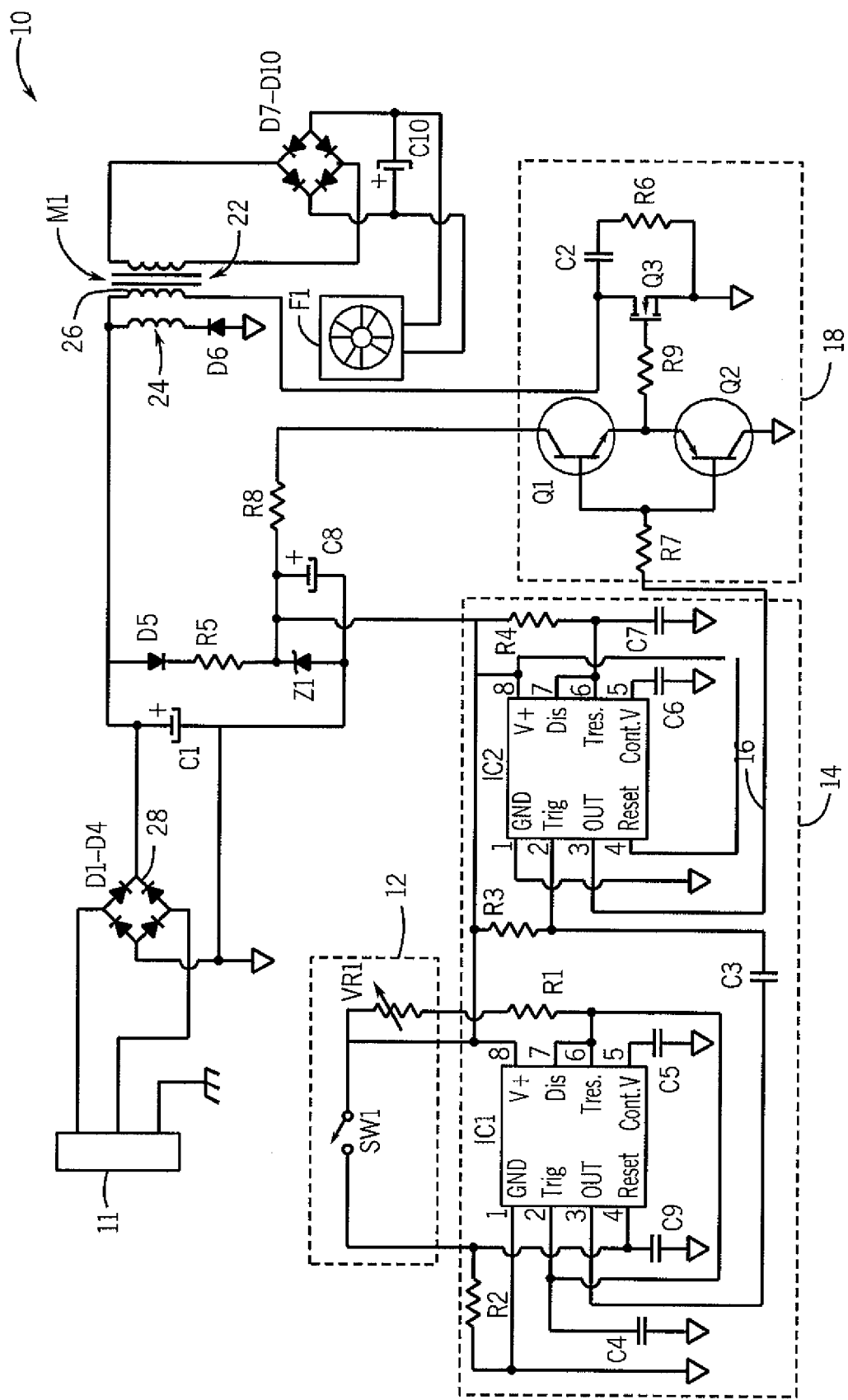

| | | | |
|---|---|---|---|
| 6,727,607 B2* | 4/2004 | Lee et al. | 310/36 |
| 6,974,061 B2* | 12/2005 | Adams et al. | 227/2 |
| 7,204,322 B2* | 4/2007 | Sakai | 173/162.1 |
| 2002/0070694 A1* | 6/2002 | Blum | 318/244 |
| 2003/0122436 A1 | 7/2003 | Desta et al. | |

OTHER PUBLICATIONS

2-Step Pro Duty Power Painter Owner's Manual, Wagner Spray Tech Corporation, 2001.

* cited by examiner

CONTINUOUSLY VARIABLE FREQUENCY SWINGING ARMATURE MOTOR AND DRIVE

CROSS-REFERENCE TO RELATED APPLICATION

This application claims the benefit of U.S. Provisional application Ser. No. 60/657,231, filed on Feb. 28, 2005, the teachings and disclosures of which are herein incorporated by reference.

BACKGROUND OF THE INVENTION

1. Field of the Invention

This invention relates generally to electromagnetic motors and their control circuitry for power tools and devices, and more particularly, to a continuously variable frequency swinging armature motor and drive for improving the performance of such power tools and devices.

2. Description of Related Art

In the design of power tools and other work devices and machines, it is a continuing design goal to improve performance parameters to enhance user operation and productivity. In such devices as airless paint sprayers, high pressure washers, electric caulk guns, speed staplers, low volume water or air pumps, portable high pressure air compressors, power chisels and scrapers, among others, such parameters may include increasing output volumes, increasing user adjustability of output, increasing operating frequency ranges, and reducing acoustic noise, heat, and weight.

The ability to improve these parameters, particularly the output volume (e.g., of a paint sprayer), without increasing the size and power of the motors and pumps within such devices would be highly advantageous.

In devices using electromagnetic-based swinging armature motors, it has been found that the electromagnets that use single windings can be designed to improve performance of the devices. Such devices that use a single winding are usually powered directly from an alternating current ("AC") line. This allows the armature to close at twice the line frequency, i.e., one time for the positive one-half of the AC waveform and one time for the negative one-half of the AC waveform. For a 60 Hz line, for example, the armature will move, open, and close 120 times per second with such an arrangement. Control over output volume (or other work done) is commonly accomplished by limiting how far the armature can move. This is sometime done by an adjustable mechanical stop. In other words, in order to control the output volume, you have to limit how far the armature can move, which is commonly accomplished by providing an adjustable mechanical stop. It would be preferable to electronically adjust the output, not mechanically.

Using a sine wave voltage to power the electromagnet is generally inefficient because the waveform has to fall to near zero volts before the armature can start to move to its open position. Therefore, there is less time for the pump's piston to fully open, and thus, there is less time for paint to enter into the pump section or reservoir of a typical paint sprayer. In addition, the armature also experiences a so-called bounce when it hits its open position stop. The bounce increases the settling time of the armature, thereby decreasing the overall output volume of the paint delivered from the typical paint sprayer. Therefore, it has been found that using other waveforms can improve electromagnetic motor performance. Also, where a DC signal is used to power an electromagnetic-based swinging armature motor, there is a need to have a current signal with a pulse width and associated circuitry that will allow the magnetic field generated by the electromagnet to collapse quickly and store the resulting energy within the circuit.

Accordingly, there is a need in the industry for a variable frequency driven swinging armature motor that can be continuously driven over a wide range of frequencies. Previous frequency adjustment solutions provided a circuit to selectively skip cycles or half cycles of the AC waveform. See e.g., U.S. Pat. Nos. 4,517,620 and 4,705,995 to Hans-Joachim Boll, the disclosures of which are hereby incorporated by reference in their entirety. Typically, this was accomplished by using a triac-type device (e.g., two thyristors wired in series, but pointing in opposite directions) that turns on and off at the zero crossings. Because the minimum period that can be skipped is one-half of a 60 Hz cycle, the frequency can only be reduced in 30 Hz increments while maintaining steady symmetrical output pressure and flow in the associated pump, which translates into drive frequencies of 120 Hz, 90 Hz, 60 Hz, and 30 Hz. Such frequency control limitations are commonly recognized as shortcomings in the industry. Therefore, a continuously variable frequency driven swinging armature motor would provide numerous benefits to the industry. Such a motor would provide more versatility and increase control in many applications. And for any applications where the lowest desired frequency is higher than the normal AC line frequency (i.e., 50–60 Hz), the electromagnet can be made physically smaller and still generate the same force, or alternatively, generate more force with the same size of electromagnet.

In accordance with the foregoing, an electromagnet based motor and associated circuitry incorporating improvements not heretofore employed for use in power tools and devices would be highly desirable.

BRIEF SUMMARY OF THE INVENTION

A power device, comprising a power source; timing circuitry powered by said power source for producing a current pulse output having a pulse width; a switch for triggering said current pulse output from said timing circuitry; and an armature motor powered by said power source and in electrical communication with said timing circuitry for receiving said current pulse from said timing circuitry, said armature motor comprising an electromagnetic core; a first winding for carrying electrical current to energize a magnetic field associated with said electromagnetic core; a second winding for carrying electrical current to re-set said magnetic field associated with said electromagnetic core, said first winding and said second winding bifilar wound about said electromagnetic core; and a swinging armature for providing movement in response to energizing said magnetic field associated with said electromagnetic core, wherein when said switch triggers said current pulse from said timing circuitry, said armature operates at said current pulse output pulse width.

BRIEF DESCRIPTION OF THE SEVERAL VIEW OF THE DRAWINGS

Figure 2:
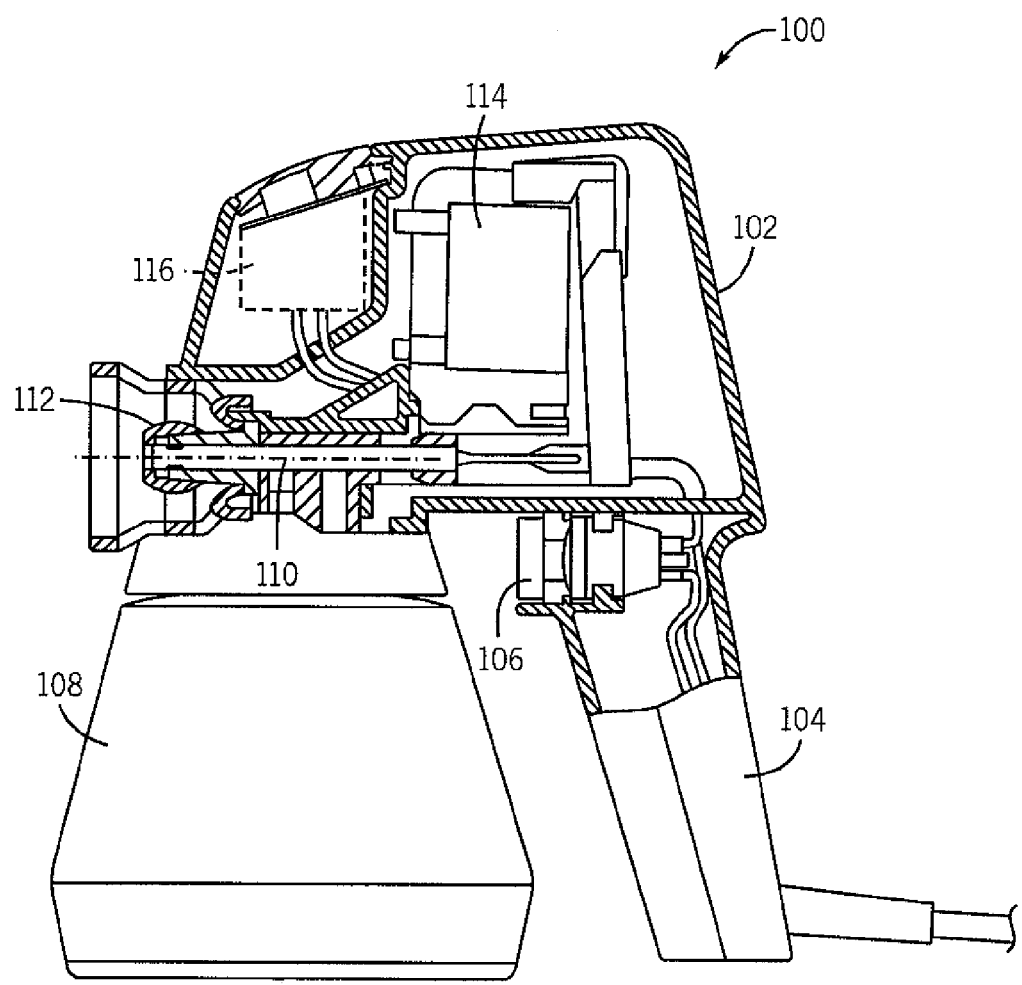

Many aspects of the invention will be better appreciated and understood in conjunction with the following drawings and Detailed Description of the Invention, which form integral components of this Specification, in which like reference numerals generally represent like elements, and in which:

FIG. 1 is an electrical schematic of an electromagnet and associated circuitry in accordance with one aspect of the present invention; and FIG. 2 is a side-elevation, partially in cross-section, of a hand-held spray gun incorporating the control circuit of FIG. 1.

DETAILED DESCRIPTION OF THE INVENTION

Referring now to FIG. 1, an electrical circuit 10 of a variable frequency driver and control circuit for a swinging armature motor is shown 10. The circuit 10 includes a common power source 11 (such as 120VAC) that provides the requisite input voltage for the applications and circuitry desired.

The circuit 10 is associated with a power device (e.g., see FIG. 2) to improve the performance thereof, examples of which include, but are not limited to, airless paint sprayers, high pressure washers, electric caulk guns, speed staplers, low volume water or air pumps, portable high pressure air compressors, power chisels and scrappers, and the like. Many other types of applied technologies may also be used in the present invention, which is particularly well-suited for applications in which additional throughput (e.g., of air, paint, water, etc.) of the power device is desired. Such devices commonly have pump pistons that are driven by a coil/oscillating armature combination.

A preferred way to adjust throughput within a desired range of a given power device (e.g., in painting applications, from a fine mist to full droplets) may be accomplished with an adjustment mechanism VR1. The adjustment mechanism VR1 is shown as a variable resistor or potentiometer, but other suitable adjustment mechanisms VR1 may also be used. The adjustable mechanism VR1 permits continuous frequency adjustment control within a given range, with the size of the adjustment mechanism VR1 being selected to obtain the desired drive frequency within the desired frequency adjustment range. In a preferred embodiment, a frequency adjustment range of 25–150 Hz is selected, although other ranges are also possible.

A low level signal switch SW1 is in electrical communication with the adjustment mechanism VR1. When closed, the switch SW1 provides a signal path to ground. In a preferred embodiment the adjustable mechanism VR1 and switch SW1 are electrically connected to the circuit 10 through an external mounting 12 that is not otherwise physically mounted to the circuit 10. Alternatively, these components may also be integrated components of the electrical circuit 10.

In any event, the adjustable mechanism VR1 and switch SW1 are electrically connected to and associated with a timing module 14 of the circuit 10. Although many timing circuit configurations may be used as part of the timing module 14, one exemplary embodiment includes a pair of 7555 timing chips IC1 (7555 Clock) and IC2 (7555 One Shot), which are used to control the timing and duration of signal pulses to be used within the circuit 10. In a preferred embodiment, both timing chips IC1 and IC2 have the following pin assignments:

| 1 | GND |
| 2 | Trig. |
| 3 | OUT |
| 4 | Reset |
| 5 | Cont. V |
| 6 | Tres. |
| 7 | Dis. |
| 8 | V+ |

The various functionalities of the timing chips IC1 and IC2 are well-known and will not be further described except as they are used herein to produce the necessary signal pulse.

In any event, the timing module 14 of the circuit 10 preferably includes the following components: resistors R1, R2, R3, and R4; timing chips IC1 and IC2; and capacitors C3, C4, C5, C6, C7, and C9. As shown, resistors R1 and R2 are electrically associated with IC1, as are capacitors C4, C5, and C9. Likewise, resistors R3 and R4 are electrically associated with IC2, as are capacitors C6 and C7. Capacitor C3 is electrically associated with both timing chips IC1 and IC2.

As an exemplary, representative, and non-limiting example, numerical values are set forth below for the electrical circuit 10 of FIG. 1. They are only provided to convey an understanding of the invention, and they are not intended to restrict the scope of the invention in any way. Nevertheless, preferred circuit elements of the circuit 10 can be dimensioned as follows:

| R1 | 2.2 kΩ |
| R2 | 2.2 kΩ |
| R3 | 100 kΩ |
| R4 | 23.7 kΩ |
| R5 | 47 kΩ |
| R6 | 47 Ω |
| R7 | 2.2 kΩ |
| R8 | 22 Ω |
| R9 | 22 Ω |
| VR1 | 0–10 kΩ |
| C1 | 390 uF |
| C2 | 5.1 nF |
| C3 | 3.3 nF |
| C4 | 1 uF |
| C5 | 0.01 uF |
| C6 | 0.01 uF |
| C7 | 0.1 uF |
| C8 | 100 uF |
| C9 | 47 uF |

As shown in FIG. 1, the switch SW1 triggers a low level signal on and off by making one of its signal paths into an open circuit. As the adjustment mechanism VR1 is adjusted, its variable resistance, in series with a resistor R1, will produce a total resistance at pin 6 of IC1, thereby adjusting the clocking function thereof. The operation of IC1 is also linked to IC2 since the output pin 3 of IC1 is connected to the input trigger pin 2 of IC2. In operation, it is the output from output pin 3 of IC2 that has the desired square wave on branch 16 with the desired pulse width. In the configuration depicted, a pulse width of about 2.8 ms is preferred. However, the pulse width is optimized according to a given electromagnet size. For example, if the size of the electromagnet is changed, the desired pulse width would also need to change in order to be optimized to the new electromagnet size. It is further contemplated that automatic adjustment of the pulse width based on, for example, the slope of current in the electromagnet, or another suitable parameter, is possible to allow for fully automatic optimization of the pulse width to accommodate fluids having varying properties, such as different fluid viscosities.

The signal on branch 16 is then transmitted to a switching network 18, which preferably includes the following a common base/common emitter NPN-PNP transistor pair Q1, Q2; a switching device such as a MOSFET Q3; resistors R6, R7, R9; and a capacitor C2. The switching of the MOSFET Q3 is tied into, and affects the operation of, an armature motor M1 in communication therewith. The armature motor M1 is a swinging armature motor, and it includes an electromagnetic wound coil. The coil includes an electromagnetic core 22 and a first winding 24 for carrying electric current to energize a magnetic field associated with the electromagnetic core 22. The coil also includes a second winding 26 for carrying current to re-set the magnetic field associated with the electromagnetic core. Both the first winding 24 and the second winding 26 are wound about the electromagnetic core 22 The first winding 24 and the second winding 26 are bifilar wound together about the electromagnetic core 22. As will be described, the motor M1 also includes a swinging armature for providing movement in response to energizing the magnetic field about the electromagnetic core 22.

The circuit 10 also includes at least one storage capacitor C1 in electrical communication with the second winding 26. When the magnetic field collapses, the storage capacitor C1 stores residual electrical energy from the electromagnetic core. The storage capacitor C1 also filters a rectified signal from a diode rectification bridge 28 (i.e., diodes D1–D4) that rectifies the 120VAC input signal from the power source 11. The electrical switching device Q3 is also in electrical communication with the storage capacitor C1 such that, when it is biased on, the storage capacitor C1 releases the electrical energy stored therein from the second winding 26. In addition, when the electrical switching device Q3 is biased on, electric current flows through an electrical steering device such as a steering diode D6 electrically connected thereto. The steering diode 36 provides an electrical path for magnetic energy to be removed from the electromagnetic core through the second winding 26. On the other hand, when the electrical switching device Q3 is biased off, the storage capacitor C1 stores electrical energy obtained from the second winding 26 when the magnetic field collapses. In a preferred embodiment, the electrical switching device Q3 is a MOSFET, and the electrical steering device is a steering diode D6.

In order to prevent undesirable or excessive heat generation, a cooling device, such as a fan F1, can also be added to the circuit 10. To power the cooling device, a winding can be added to generate an appropriate voltage level. During normal operation, that is, within a typical frequency range of about 25 HZ to about 150 HZ, if the frequency is adjusted above a certain level (e.g., above 150 HZ), then when the winding temperature exceeds 125° Celsius, the frequency can be automatically reduced to a pre-determined certain level. If the temperature of coil or winding reaches a second level (e.g., 140° Celsius), the frequency can be reduced even further, for example, to 80 HZ. Should the temperature continue to climb and reach a maximum allowed temperature (e.g., 155° Celsius, the unit can be configured to automatically shut off until that temperature falls below a predetermined temperature, or until the power device is turned off. The coil can also be driven unipolar with pulsating DC power. The power winding 1-3 can be wound bifilar with reset winding 2-4.

As described, the stored magnetic energy in the electromagnet is largely conserved and returned to the storage capacitor C1 at the end of each duty cycle, whereby it can then be re-used. This increases electrical efficiency. This is possible because two bifilar windings (for optimal magnetic coupling) are used instead of only one winding. The first winding 24 is the power winding for the electromagnet. The second winding 26, which in one preferred embodiment is smaller in current-carrying capacity than the first winding, is connected electrically and in anti-parallel. It functions as a re-set winding. This second winding 26, combined with the steering diode D6, allows a path for the energy to be removed from the magnetic core, which is necessary before the next power cycle is applied. Since a square wave voltage is applied to the electromagnet, the armature can close more swiftly. Thus, this second winding 26 decreases the magnetic field more rapidly and allows the armature to move to its open position more quickly.

The net result is that this allows higher frequency operation and greater output volume for a given power device.

As further exemplary, representative, and non-limiting examples, component types are set forth below for the electrical circuit 10 of FIG. 1. They are only provided to convey an understanding of the invention, and they are not intended to restrict the scope of the invention in any way. Nevertheless, preferred components of the circuit 10 can be as follows, as available from any suitable vendor:

| | |
|---|---|
| D1–D4 | 1N5408 |
| D5 | 1N4004 |
| D6 | MUR850 |
| D7–D10 | 1N4001 |
| Z1 | 1N4742 |
| Q1 | 2N4401 |
| Q2 | 2N4403 |
| Q3 | IRFP460P |
| IC1–IC2 | ICM7555 |
| F1 | RS 273-239 |
| SW1 | |
| M1 | |

Referring now to FIG. 2, a power device is shown, as readily suited for the inventive arrangements as described hereinout. More specifically, the representative power device is a spray gun 100, although numerous other power devices are also hereby contemplated. In any event, the representative spray gun 100 includes a gun casing 102 and handgrip 104 depending therefrom, with a representative on/off trigger switch 106 provided therein the grip 104. A reservoir 108 for the medium to be sprayed (e.g., paint or other) is secured to the underside of the gun casing 102. This medium to be sprayed is drawn up by a representative pump 110, which is driven by a coil/oscillating armature combination and disposed within the gun casing 102. Thereafter, this medium to be sprayed is conveyed to a representative spray nozzle 112 for application. Internally, an electric swinging armature drive 114 is mounted within the gun casing 102 to drive the pump 110. An electronic control circuit 116 for the pump 110 and swinging armature drive 114 is also disposed within the gun casing 102, although relative positions thereof are only depicted for exemplary, representative, and non-limiting purposes. Other suitable arrangements thereof are also contemplated hereby. In any event, the electronic control circuit 116 for the swinging armature drive 114 preferably comprises the electrical circuit of FIG. 1, as described hereinout.

Referring again to FIG. 1, when the switch SW1 triggers the current pulse from the timing circuitry 14, the armature of the motor M1 operates at the desired current pulse output pulse width. An exemplary winding structure for winding 1-3 is 380 turns of 3×#25AWG wire and winding 2-4 is 380 turns of 1×#25AWG wire.

In a preferred embodiment, the electrical circuit 10 is used as part of a power device. As such, the power device can also include the afore-described power source 12; timing circuitry 14 powered by the power source 12 for producing a current pulse output having a pulse width; a switch Q3 for triggering the current pulse output produced by the timing circuitry 14; and an armature motor M1 powered by the power source 12 and in electrical communication with the timing circuitry 14 for receiving the current pulse therefrom.

The power device can also comprise a frequency adjustment control mechanism in electrical communication with the timing circuitry 14 for electronically varying the pulse width by adjusting the frequency adjustment control mechanism. In one embodiment, the frequency adjustment control mechanism can be a potentiometer. In one embodiment, the power device of the pulse width can be about 2.8 ms. In one embodiment, the current pulse output is a continuous symmetrical output. In one embodiment, the frequency adjustment control mechanism permits infinite frequency adjustment within a desired operating frequency range.

In another preferred embodiment, a variable speed swinging armature motor can comprise an electromagnetic core; a first winding for carrying electric current to energize a magnetic field about the electromagnetic core; a second winding for carrying current to re-set the magnetic field associated with the electromagnetic core, the first and second windings wound about the electromagnetic core; and a swinging armature for providing movement in response to the energizing of the magnetic field associated with the electromagnetic core. The first winding and the second winding are bifilar wound together about the electro-magnetic core. The removal of energy from the electro-magnetic core can occur prior to a succeeding tenderization cycle of the electro-magnetic core. The second winding can have a current-carrying capacity that is less than a current-carrying capacity of the first winding. The motor can utilize an AC line frequency. In one embodiment, a square wave voltage is applied to the first winding and the second winding. The AC line frequency can be about 50–60 Hz.

In another embodiment, disclosed herein is a variable frequency driver and swinging armature motor combination. The combination comprises: a variable speed swinging armature motor as previously described and a control circuit for controlling the variable speed swinging armature motor. The control circuit comprises: timing circuitry for producing a current pulse output having a pulse width; a switch for triggering the current pulse output produced by the timing circuitry; a storage capacitor in electrical communication with the second winding and wherein the storage capacitor stores residual electrical energy collected from when the magnetic field associated with the electromagnetic core collapses; and an electrical switching device in electrical communication with the storage capacitor such that, when the electrical switching device is biased so as to be turned on, the storage capacitor releases the electrical energy stored therein from the second winding.

In one embodiment, the combination farther comprises a frequency adjustment control mechanism in electrical communication with the timing circuitry for electronically varying the pulse width by adjustment of the frequency adjustment control mechanism.

It should be understood that this specification describes exemplary, representative, and non-limiting embodiments of the invention. Accordingly, the spirit and scope of this invention are not limited to any of these embodiments. Rather, the details and features of these embodiments were disclosed as required. Thus, many changes and modifications—as apparent to those skilled in the art—are within the scope of the invention without departing from the spirit hereof, and the inventive arrangements are inclusive thereof. Accordingly, to apprise the public of the spirit and scope of this invention, the following claims are made:

What is claimed is:

1. A power device, comprising:
  a power source;
  timing circuitry powered by said power source for producing a current pulse output having a pulse width;
  a switch for triggering said current pulse output from said timing circuitry; and
  an armature motor powered by said power source and in electrical communication with said timing circuitry for receiving said current pulse from said timing circuitry, said armature motor comprising;
  an electromagnetic core;
  a first winding for carrying electrical current to energize a magnetic field associated with said electromagnetic core;
  a second winding for carrying electrical current to re-set said magnetic field associated with said electromagnetic core, said first winding and said second winding bifilar wound together about said electromagnetic core; and
  a swinging armature for providing movement in response to energizing said magnetic field associated with said electromagnetic core,
  wherein when said switch triggers said current pulse from said timing circuitry, said armature operates at said current pulse output pulse width.

2. The power device of claim 1, further comprising:
  at least one storage capacitor in electrical communication with said second winding,
  wherein said storage capacitor stores residual electrical energy from said electromagnetic core when said magnetic field collapses.

3. The power device of claim 2, further comprising:
  an electrical switching device in electrical communication with said storage capacitor, wherein when said electrical switching device is biased on, said storage capacitor releases electrical energy stored within said second winding.

4. The power device of claim 3, wherein when said electrical switching device is biased on, electrical current flows through a steering diode.

5. The power device of claim 3, wherein when said electrical switching device is biased off, said storage capacitor stores electrical energy from said second winding.

6. The power device of claim 3, wherein said electrical switching device is a MOSFET.

7. The power device of claim 1, wherein said power device is a paint sprayer.

8. The power device of claim 1, further comprising:
  a frequency adjustment control mechanism in electrical communication with said timing circuitry for electronically varying said pulse width.

9. The power device of claim 8, wherein said frequency adjustment control mechanism is a potentiometer.

10. The power device of claim 8, wherein said frequency adjustment control mechanism permits infinite frequency adjustment within a desired operating frequency range.

11. The power device of claim 1, wherein said pulse width is about 2.8 ms.

12. The power device of claim 1, wherein said current pulse output is a continuous symmetrical output.

13. The power device of claim 1, further comprising:
an electrical steering device electrically connected to said second winding to provide an electrical path for magnetic energy to be removed from said electromagnetic core through said second winding.

14. A variable speed swinging armature motor, comprising:
an electromagnetic core;
a first winding for carrying electrical current to energize a magnetic field associated with said electromagnetic core;
a second winding for carrying electrical current to re-set said magnetic field associated with said electromagnetic core, said first winding and said second winding bifilar wound together about said electromagnetic core; and
a swinging armature for providing movement in response to energizing said magnetic field associated with said electromagnetic core.

15. The variable speed swinging armature motor of claim 14, wherein removing energy from said electromagnetic core occurs before a succeeding energization cycle of said electromagnetic core.

16. The variable speed swinging armature motor of claim 14, wherein said second winding has a current carrying capacity that is less than a current carrying capacity of said first winding.

17. The variable speed swinging armature motor of claim 14, wherein said motor utilizes an AC line frequency.

18. The variable speed swinging armature motor of claim 17, wherein said AC line frequency is about 50–60 Hz.

19. The variable speed swinging armature motor of claim 14, wherein a square wave voltage is applied to said first winding and to said second winding.

20. A variable frequency driver and swinging armature motor combination, comprising:

i) a variable speed swinging armature motor, comprising:
an electromagnetic core;
a first winding for carrying electrical current to energize a magnetic field associated with said electromagnetic core;
a second winding for carrying electrical current to re-set said magnetic field associated with said electromagnetic core, said first winding and said second winding bifilar wound together about said electromagnetic core; and
a swinging armature for providing movement in response to energizing said magnetic field associated with said electromagnetic core;

ii) a control circuit for controlling said variable speed swinging armature motor, comprising:
timing circuitry for producing a current pulse output having a pulse width;
a switch for triggering said current pulse output from said timing circuitry;
at least one storage capacitor in electrical communication with said second winding,
wherein said storage capacitor stores residual electrical energy from said electromagnetic core when said magnetic field collapses; and iii) an electrical switching device in electrical communication with said storage capacitor, wherein when said electrical switching device is biased on, said storage capacitor releases electrical energy stored within said second winding.

21. The combination of claim 20, further comprising:
a frequency adjustment control mechanism in electrical communication with said timing circuitry for electronically varying said pulse width.

* * * * *